(12) United States Patent
AbuEideh

(10) Patent No.: US 9,954,381 B2
(45) Date of Patent: Apr. 24, 2018

(54) POWER-REGULATING CHARGER

(71) Applicant: Ghaith AbuEideh, Chicago, IL (US)

(72) Inventor: Ghaith AbuEideh, Chicago, IL (US)

( * ) Notice: Subject to any disclaimer, the term of this patent is extended or adjusted under 35 U.S.C. 154(b) by 0 days.

(21) Appl. No.: 15/422,457

(22) Filed: Feb. 1, 2017

(65) Prior Publication Data

US 2017/0222460 A1 Aug. 3, 2017

Related U.S. Application Data

(60) Provisional application No. 62/289,455, filed on Feb. 1, 2016.

(51) Int. Cl.
| | |
|---|---|
| *H04B 1/38* | (2015.01) |
| *H02J 7/00* | (2006.01) |
| *H04B 1/3883* | (2015.01) |

(52) U.S. Cl.
CPC ............ *H02J 7/0045* (2013.01); *H02J 7/007* (2013.01); *H04B 1/3883* (2013.01); *H02J 2007/0096* (2013.01)

(58) Field of Classification Search
USPC .................. 455/573, 343.1–343.6, 550.1
See application file for complete search history.

(56) References Cited

U.S. PATENT DOCUMENTS

| | | | | |
|---|---|---|---|---|
| 7,183,748 | B1 * | 2/2007 | Unno .................... | H02J 7/0013 320/134 |
| 2008/0061733 | A1 * | 3/2008 | Toya ....................... | H02J 7/025 320/103 |
| 2009/0267562 | A1 * | 10/2009 | Guccione .............. | H02J 7/0054 320/114 |
| 2015/0188346 | A1 * | 7/2015 | Oku ....................... | H02J 7/0029 320/107 |
| 2016/0164322 | A1 * | 6/2016 | Li ............................ | H02J 7/00 320/137 |
| 2016/0295000 | A1 * | 10/2016 | Tanaka ................. | H04M 1/7253 |
| 2016/0322834 | A1 * | 11/2016 | Carpenter, Jr. ......... | H02J 7/007 |

* cited by examiner

*Primary Examiner* — Fayyaz Alam

(57) ABSTRACT

A power-regulating charger is an apparatus used to manage the flow of electrical power to the battery of a mobile computing device. To accomplish this, the power-regulating charger includes an electrical plug, an output terminal, a shutoff switch, a microcontroller, and a wireless communication module. The electrical plug is a male connection terminal used to connect the power-regulating charger to an external power supply. The output terminal is an electrical terminal used to transfer power from the power-regulating charger into the connected mobile computing device. The shutoff switch is electrically connected between the electrical plug and the output terminal and is used to open the circuit between these two components. The microcontroller is a processing device that directs the shutoff switch to enable or inhibit the transfer of power. The wireless communication module receives commands that are wirelessly transmitted to the power-regulating charger from the mobile computing device.

1 Claim, 4 Drawing Sheets

US 9,954,381 B2

POWER-REGULATING CHARGER

The current application claims a priority to the U.S. Provisional Patent application Ser. No. 62/289,455 filed on Feb. 1, 2016.

FIELD OF THE INVENTION

The present invention relates generally to a smart charging system for mobile computing devices. More specifically, the present invention relates to a charger with wireless connectivity that uses wirelessly transmitted commands to enable of prevent the flow of electrical power to a connected mobile computing device. A user of the present invention is able to limit wasted power, while extending the life of a battery of a connected mobile computing device, by shutting off current flow to the battery, once the charge reaches a specified threshold.

BACKGROUND OF THE INVENTION

It is estimated that the average smartphone wastes 6.5 kilowatt hour (kWh) a year by being plugged in overnight. While this number represents a fraction of the average American home's annual electrical usage, the number becomes significant when applied to multiple devices across multiple homes. With over 117 million homes in the U.S. alone, this seemingly insignificant figure becomes staggeringly large; rivaling the power consumption of small countries. Once this number is applied to global smartphone usage, it becomes even more evident that the way we charge smartphones needs to be changed. In addition to wasting vast amount of energy, the practice of leaving smartphones plugged in overnight damages the smartphone's battery. When a smartphone remains connected to an external power supply after its battery is fully charged, the performance of the battery declines. Chronically overcharging a battery reduces the battery's lifespan.

The present invention, the power-regulating charger, addresses these problems by implementing a smart charging system which turns off the flow of power to a connected smartphone. The present invention accomplishes this by actively monitoring the charge stored within a smartphone's battery. Once the charge reaches a predetermined threshold, the present invention turns off the current flow. To ensure the user has a fully charged device when the user unplugs the phone, the present invention restarts the current flow to the smartphone battery once the charge falls below a predefined threshold. In this way, the present invention saves energy and extends the life of smartphone batteries.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 4, the present invention, the power-regulating charger, is a charger for a mobile computing device. It is an aim of the present invention to provide a mobile device charger that receives wireless commands to continue or shut off the flow of electrical power to the battery of a connected mobile computing device. This functionality prevents wasted energy and battery damage by preventing excess electrical power from being supplied to a fully charged battery. To accomplish this, the present invention is equipped with a wireless radio that communicates with a remote computing device that is capable of analyzing the level of charge stored within the battery of the mobile computing device connected to the present invention. The present invention selectively transmits power to the connected mobile computing device when directed by the remote computing device. In the preferred embodiment of the present invention, the mobile computing device functions as the remote computing device and wirelessly transmits commands to the charger based on the level of charged stored within the mobile computing device internal battery. In a first alternative embodiment the remote computing device is a remote server that issues commands to the present invention.

Figure 1:
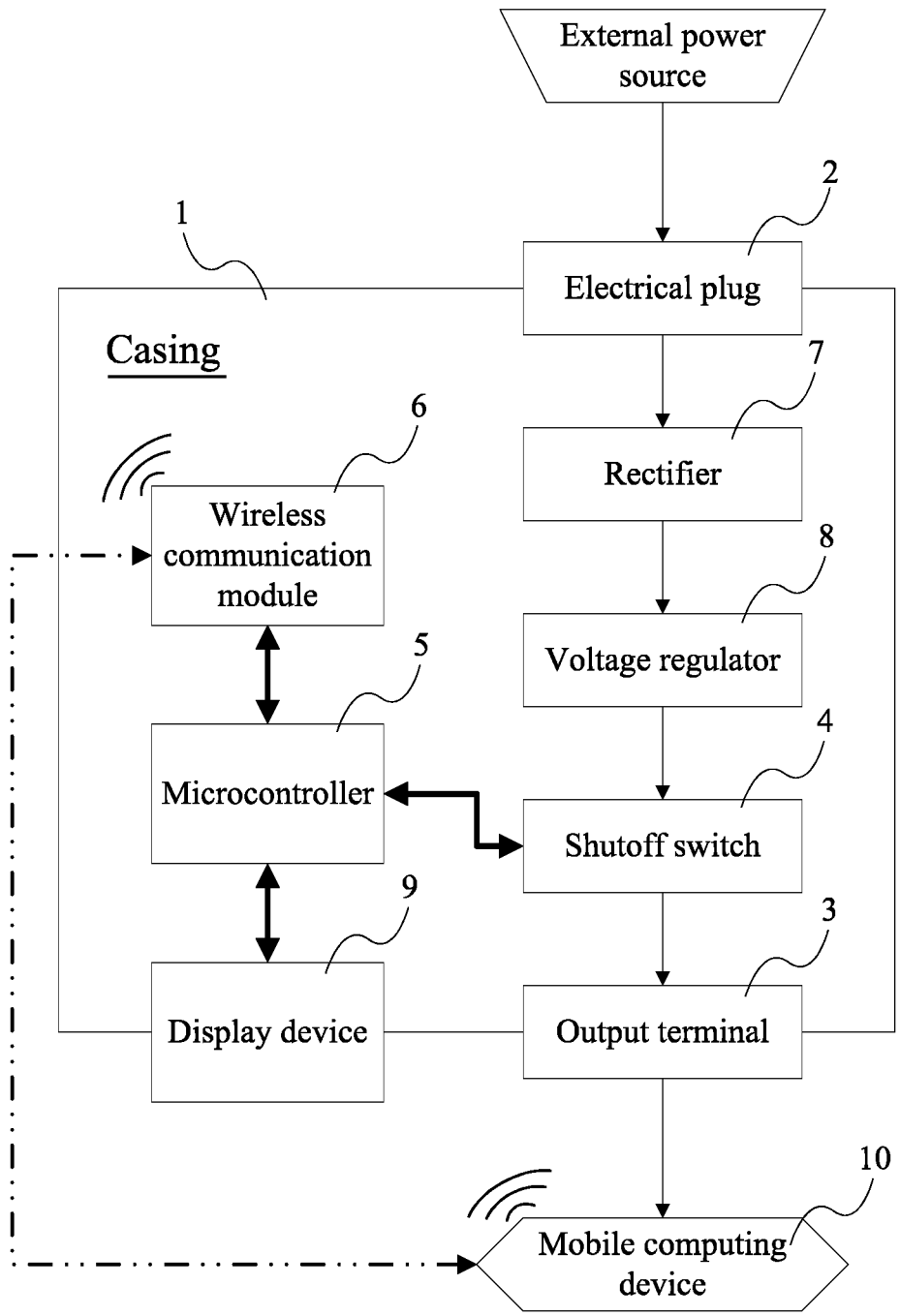
FIG. 1 is a block diagram of the present invention, wherein thinner flowlines represent electrical connections between components, thicker flowlines represent electronic connections between components, and dashed flow lines indicate the components being communicably coupled.

In reference to FIG. 1, the present invention is a power regulating charger that is used to deliver electrical power to a connected mobile computing device. To accomplish this, the present invention comprises an electrical plug 2, an output terminal 3, a shutoff switch 4, a microcontroller 5, and a wireless communication module 6. The electrical plug 2 is an electrical terminal that allows the present invention to receive electrical power from an external power supply. The output terminal 3 is an electrical terminal that allows the present invention to send electrical power to an external electrical load. Preferably, the output terminal 3 delivers electrical power required to charge the battery of the connected mobile computing device. The shutoff switch 4 is a programmable electrical switch capable of opening or closing a circuit in response to a command received from an electronically connected microcontroller 5. The microcontroller 5 is a processing device that interprets commands received from the remote computing device and uses these commands to manage the operation of the electrical components within the present invention. The wireless communication module 6 is a wireless radio that connects and communicates with external devices via wireless data transmission protocols. The wireless communication module 6 is capable of using standards including, but not limited to, such as Bluetooth, WI-FI, GSM, CDMA, and ZigBee.

The overall configuration of the aforementioned components allow the present invention to selectively transfer electrical power from an external power source to the mobile computing device. The electrical plug 2 is electrically connected to the output terminal 3 through the shutoff switch 4 so that the shutoff switch 4 is able to govern the flow of electrical current from the electrical plug 2 to the output terminal 3. The microcontroller 5 is electronically connected to the shutoff switch 4. Consequently, the microcontroller 5 is able to issue the commands which direct the shutoff switch 4 to open the circuit between the electrical plug 2 and the output terminal 3; thus, preventing electrical current to flow between the electrical plug and the output terminal. Conversely, the microcontroller 5 is able to issue the commands that direct the shutoff switch 4 to close the circuit between the electrical plug 2 and the output terminal 3; thus, enabling electrical current to flow between the two components. Finally, the wireless communication module 6 is electronically connected to the microcontroller 5. As a result, the wireless communication module 6 is able to transmit wirelessly received commands to the microcontroller 5. This connection enables the microcontroller 5 to execute the commands that have been wirelessly issued by the remote computing device.

In reference to FIG. 1, the present invention further comprises a casing 1, which provides a structural enclosure for the other components of the present invention. The casing 1 is preferably a rigid housing used to maintain the components of the present invention in desired positions. As such, the shutoff switch 4, the microcontroller 5, and the wireless communication module 6 are positioned within the casing 1. Thus, the casing 1 protects these electronic components from being inadvertently damaged by objects in the external environment. The casing is a preferably an ergonomic shape so that a user is easilly able to insert the electrical plug 2 into any kind of external power supply, such as wall sockets, surge protectors, extension cords, etc. The electrical plug 2 traverses out of the casing 1. Accordingly, the electrical plug 2 is able to connect the casing 1 to the electrical socket of an external power supply. This connection forms a detachable mount that maintains the present invention in a fixed position until the electrical plug 2 is detached from the external power supply. Additionally, the detachable connection with the external power supply that is established by the electrical plug 2 maintains the electrical plug 2 in electrical communication with the external power supply.

In a second alternative embodiment of the present invention, the output plug 2 is a female electrical receptacle into which the user is able to insert the male connector of a standard wall charger. In this embodiment, the present invention functions as an intermediary device that is positioned between the standard wall charger and the mobile computing device. Thus positioned, the present invention is able to interrupt the flow of electrical power from the standard wall charger to the connected mobile computing device based on commands issued by the mobile computing device.

The output terminal 3 traverses into the casing 1 so that a mobile computing device is able to electrically connect to the present invention. The electrical plug 2 is preferably a male terminal that is inserted into a female socket. Conversely, the output terminal 3 is preferably a receptacle into which a male terminal is inserted. In the present invention, the electrical plug 2 is designed to meet the specifications for types A through O of the international standards for electrical outlet plugs. A third alternative embodiment of the present invention is designed with an electrical plug 2 that can be connected to the cigarette lighter receptacle of a vehicle.

Figure 2:
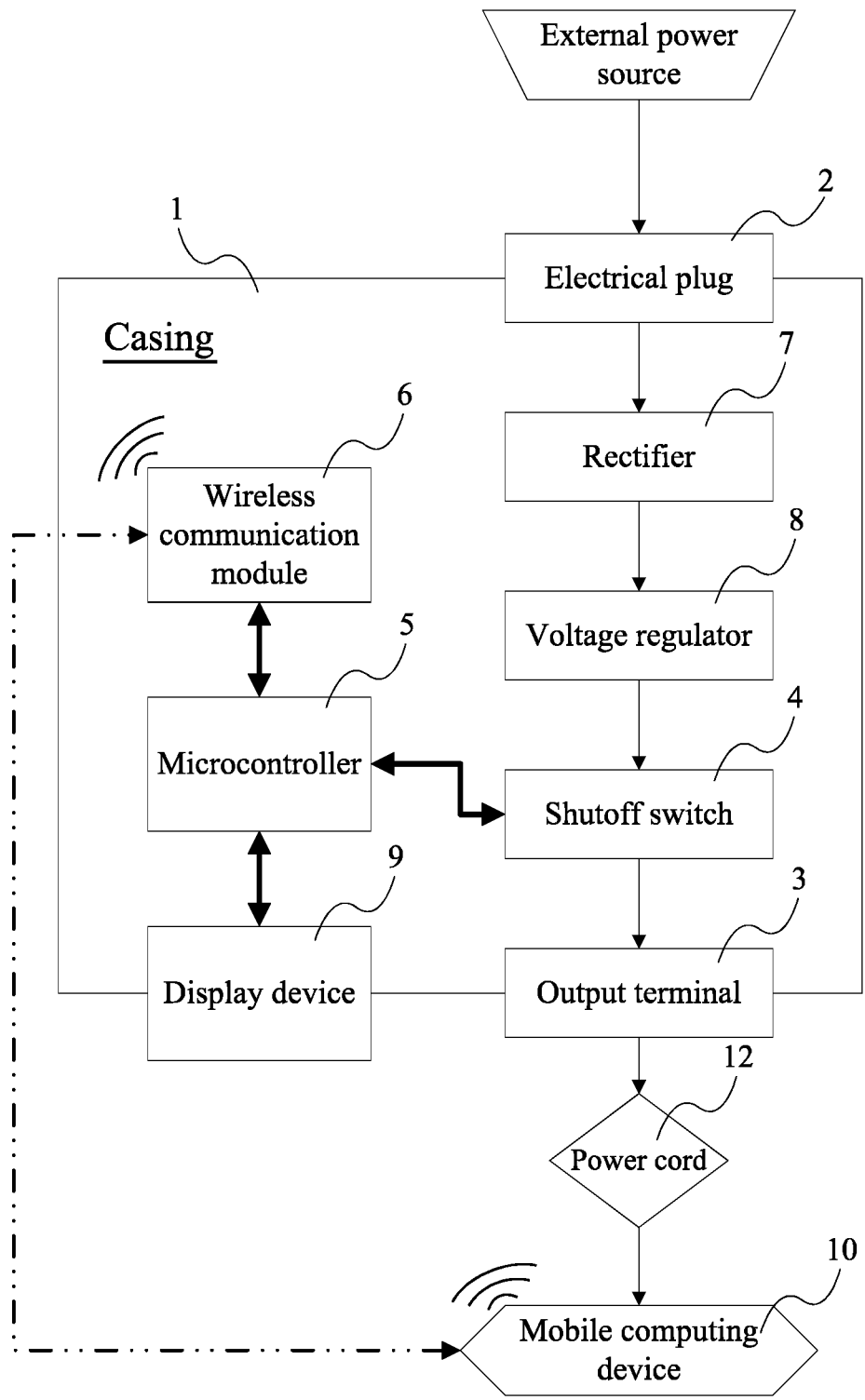
FIG. 2 is a block diagram of the present invention with a power cord connecting the output terminal to the mobile computing device, wherein thinner flowlines represent electrical connections between components, thicker flowlines represent electronic connections between components, and dashed flow lines indicate the components being communicably coupled.
Figure 3:
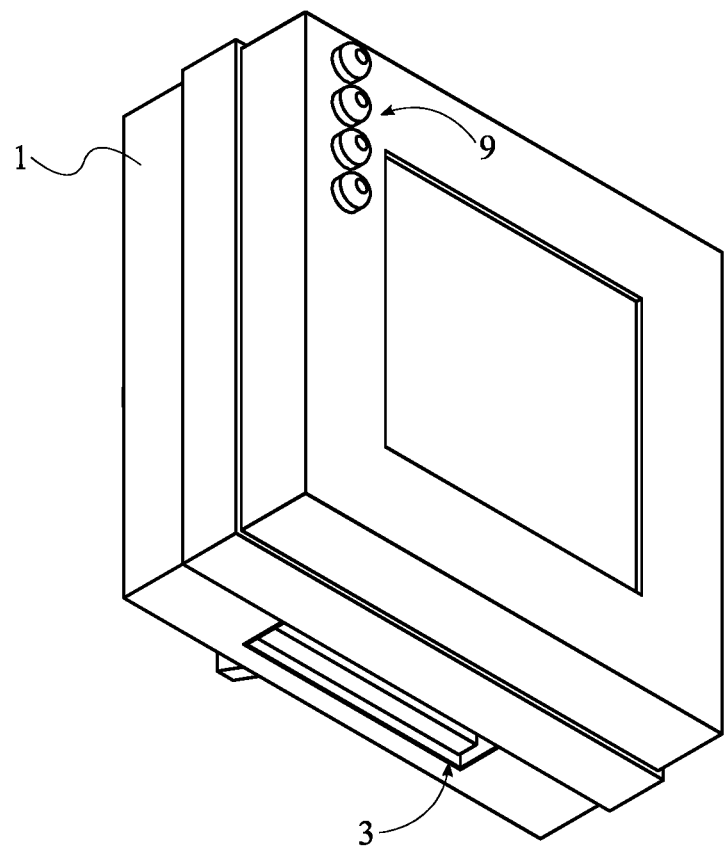
FIG. 3 is a front perspective view of the present invention.
Figure 4:
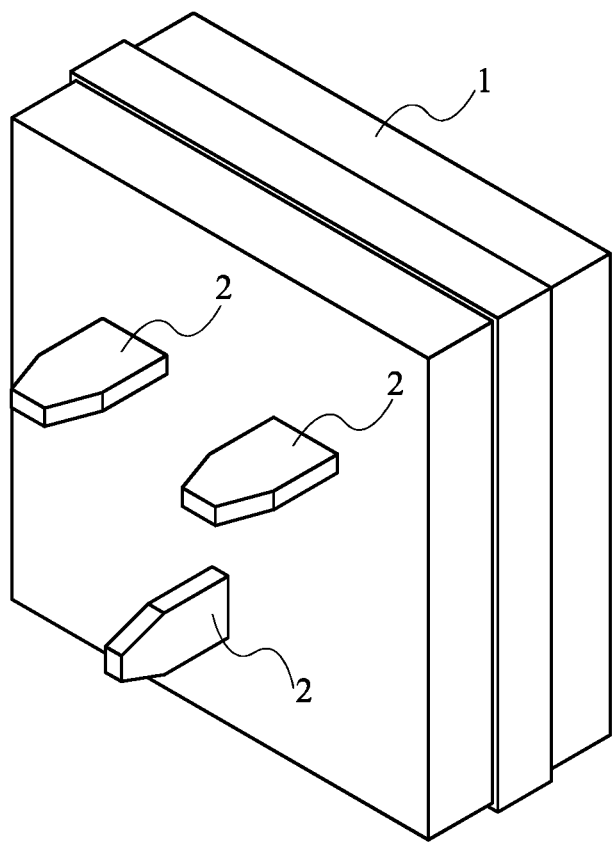
FIG. 4 is a rear perspective view of the present invention.

In reference to FIG. 1 and FIG. 2, the present invention further comprises a rectifier 7 that is used to convert the alternating current (AC) voltage delivered by the external power supply into direct current (DC) that is used to charge the battery of the connected mobile computing device. Additionally, the present invention further comprises a voltage regulator 8 that is an electrical component used to maintain the DC voltage that is generated by the rectifier 7 at a constant level. The rectifier 7 is electrically connected to the voltage regulator 8. Consequently, the voltage regulator 8 is able to use the irregular voltage generated by the rectifier 7 to output a constant voltage. The rectifier 7 and the voltage regulator 8 are electrically integrated in between the electrical plug 2 and the output terminal 3. As a result, the rectifier 7 and the voltage regulator 8 are able to convert the AC voltage that is supplied to the electrical plug 2 into a DC voltage which can be delivered to the battery of the connected mobile computing device. More specifically, the rectifier 7 and the voltage regulator 8 being electrically integrated in between the electrical plug 2 and the shutoff switch 4. Thus integrated, the shutoff switch 4 is able to open to prevent power surges as well as the flow of electrical power into the connected mobile computing device.

In reference to FIG. 1 and FIG. 2, the present invention further comprises a display device 9 that is used to generate a visual representation of the electrical state of the battery of the mobile computing device that is connected to the output terminal 3. The display device 9 is electronically connected to the microcontroller 5 so that the microcontroller 5 is able to dictate the type of information which is visually output by the display device 9. Furthermore, the display device 9 is externally mounted to the casing 1. Consequently, the display device 9 is maintained in a position that facilitates visual inspection by the user. That is, the display device 9 is mounted onto the casing 1 in a position that enables the user to easily determine the electrical state of the connected mobile computing device 10. In the preferred embodiment of the present invention, the display device 9 is a plurality of light emitting diodes (LED) positioned on the exterior surface of the casing 1. In this embodiment, the display device 9 illuminates one or more LEDs to indicate the charge in a connected device, as well as the state of the current charging operation. In a fourth alternative embodiment of the present invention, the display device 9 is a digital display capable of rendering text and graphics to convey pertinent system information.

In reference to FIG. 1 and FIG. 2, a system for implementing the power-regulating charger described herein further comprises a mobile computing device 10. The use of this system enables the power-regulating charger to charge the battery of the mobile computing device 10. Additionally, the system enables the mobile computing device 10 to wirelessly transmit commands to the power-regulating charger. The transmitted commands direct the power-regulating charger to deliver power to, or to cease delivering power to, the mobile computing device 10. To accomplish this, the mobile computing device 10 comprises a portable power source 11 which is preferably a rechargeable battery. Furthermore, the output terminal 3 is operatively coupled to a portable power source 11, wherein the output terminal 3 is used to recharge the portable power source 11. Consequently, the output terminal 3 is able to deliver electrical power to the portable power source 11. In a fifth alternate embodiment of the present invention, the output terminal 3 and portable power source 11 are equipped with wireless charging systems. In this embodiment, the output terminal 3 uses electromagnetic fields to transfer electrical power to the portable power source 11. The mobile computing device 10 is communicably coupled to the wireless communication module 6. As a result, the mobile computing device 10 is able to wirelessly transmit commands to the power-regulating charger. In the preferred embodiment of the present invention, the system for implementing the power-regulating charger further comprises a power cord 12. The output terminal 3 is electrically connected to the portable power source 11 by the power cord 12. As a result, the power-regulating charger is able to deliver electrical power to the mobile computing device 10 through the physically connection established through the power cord 12.

To implement the aforementioned system, the present invention makes use of a software control system that is a program used initiate or terminate charging operations based on the amount of charge in the battery of a smartphone. The software control system comprises a user interface (UI) engine, a hysteresis engine, and an operation control engine. The term 'engine' is used herein to refer to collections of programs that are grouped based upon function. The software control system enables a user to set the amount of charge stored in a portable power source where the present invention enables or inhibits current flow to a connected mobile computing device. That is, the UI engine enables the user to select the percentage of battery depletion where the operation control engine will generate a start command; instructing the present invention to initiate a charging operation. Additionally, the UI engine is enables the user to set the percentage charge where the operation control engine generates a stop command; instructing the present invention to terminate the charging operation.

Although the invention has been explained in relation to its preferred embodiment, it is to be understood that many other possible modifications and variations can be made without departing from the spirit and scope of the invention as hereinafter claimed.

What is claimed is:
1. A charging system comprising:
a casing;
an electrical plug;
an output terminal, the output terminal being an electrical receptacle;
a shutoff switch;
a microcontroller;
a wireless communication module;
a rectifier;
a voltage regulator;
a display device;
a mobile computing device, the mobile computing device comprising a portable power source;
a power cord;
the electrical plug and the electrical receptacle traversing through the casing;
the shutoff switch, the microcontroller, the wireless communication module, the rectifier and the voltage regulator being positioned within the casing;
the display device being mounted onto an exterior surface of the casing;
the mobile computing device and the power cord being positioned outsides the casing;
the electrical plug being electrically connected to the portable power source of the mobile computing device sequentially through the rectifier, the voltage regulator, the shutoff switch, the electrical receptacle and the power cord;
the microcontroller and the shutoff switch being electronically connected to each other;
the microcontroller and the wireless communication module being electronically connected to each other;
the microcontroller and the display device being electronically connected to each other;
the rectifier, the voltage regulator and the shutoff switch being electrically integrated in between the electrical plug and the electrical receptacle;
the electrical plug being configured to be electronically connected to an external power source such that the portable power source of the mobile computing device is charged via an electrical power supplied from the external power source; and
the mobile computing device being communicably coupled to the wireless communication module so as to wirelessly transmit commands to the wireless communication module.

* * * * *